Inventor:
Elmer O. Thompson
by his Attorneys
Howson & Howson

Feb. 23, 1954

E. O. THOMPSON 2,670,210

PHONOGRAPH APPARATUS

Original Filed April 18, 1945

3 Sheets-Sheet 2

Inventor:
Elmer O. Thompson
by his Attorneys
Howson & Howson

Feb. 23, 1954

E. O. THOMPSON

PHONOGRAPH APPARATUS 2,670,210

Original Filed April 18, 1945

3 Sheets-Sheet 3

Inventor:
Elmer O. Thompson
by his Attorneys
Howson & Howson

Patented Feb. 23, 1954

2,670,210

UNITED STATES PATENT OFFICE 2,670,210

PHONOGRAPH APPARATUS

Elmer O. Thompson, Grasmere, N. Y., assignor to Philco Corporation, Philadelphia, Pa., a corporation of Pennsylvania Original application April 18, 1945, Serial No. 589,019. Divided and this application March 6, 1950, Serial No. 147,963

5 Claims. (Cl. 274—9)

This invention relates to the control of phonographs, and more particularly to the control of the driving motor for the record-supporting turntable of a phonograph.

The present invention is especially applicable to phonographs of the type in which the turntable is automatically stopped at the end of the playing of a record and is started by the movement of a member which may be under control of the user. An example of such a phonograph is that shown in my prior Patent No. 2,508,845, issued May 23, 1950, of which this application is a division.

One object of the present invention is to provide a control arrangement for a phonograph wherein a switch is controlled by movements of two members to effect opening and closing of the switch.

Another object of the invention is to provide such a control arrangement for use in a phonograph of the type above mentioned.

In a phonograph apparatus of the type referred to, the phonograph mechanism is enclosed in a housing or casing having a slot-like opening for insertion and removal of a record and also having a door associated with such opening. In the use of such apparatus, the user has only to insert and remove records, and to open and close the door. As applied to such a phonograph, the present invention provides for automatic stoppage of the turntable at the end of the playing of a record, and further provides for automatic starting of the turntable in response to closing movement of the door.

The invention may be clearly understood by reference to the accompanying drawings wherein it is shown applied to a phonograph apparatus of the type above mentioned.

Figures 1, 2:
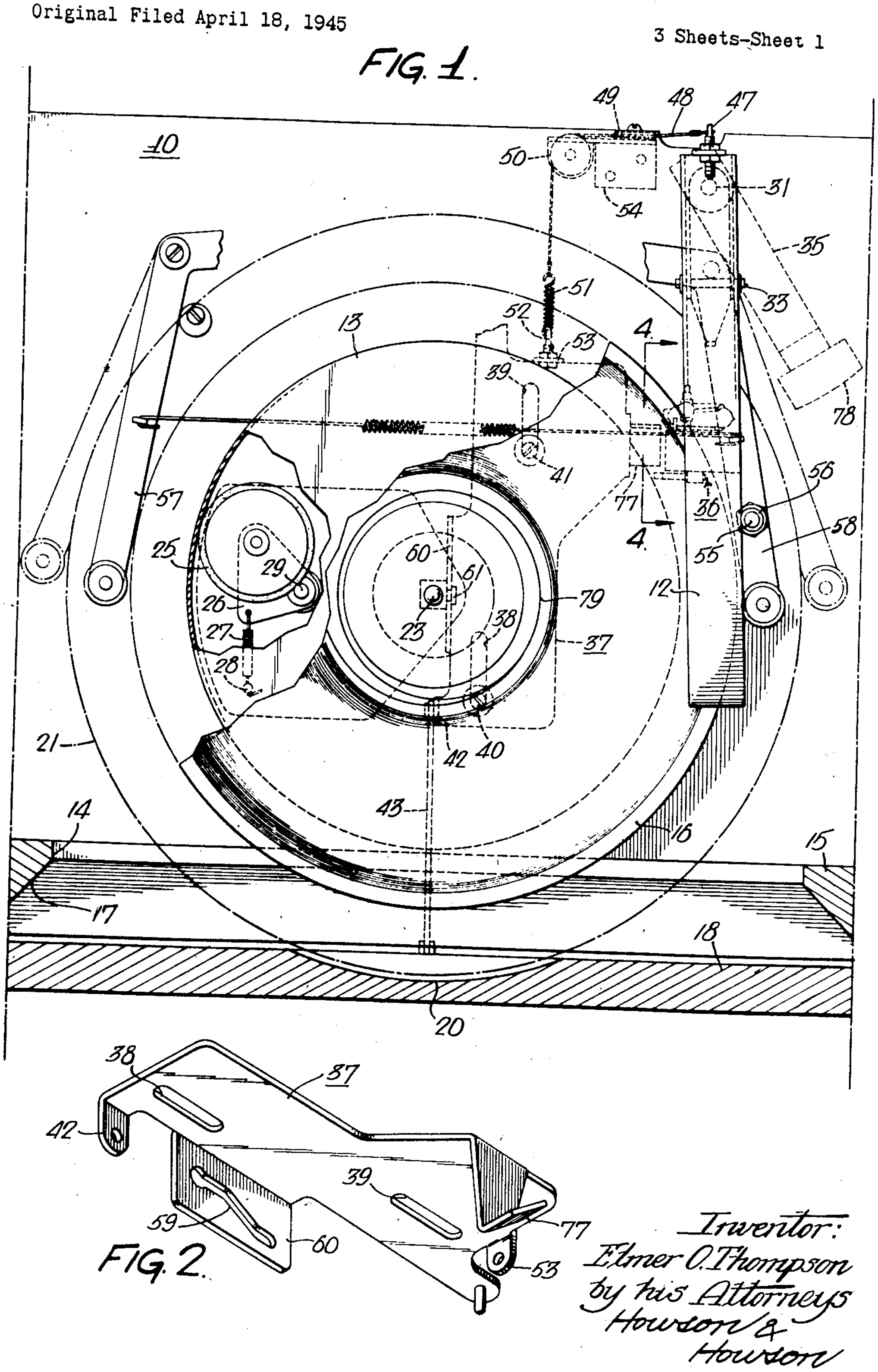
Fig. 1 is a horizontal sectional view showing the phonograph apparatus in plan.
Fig. 2 is a perspective view of a slide member which serves to actuate certain parts.
Figure 3:
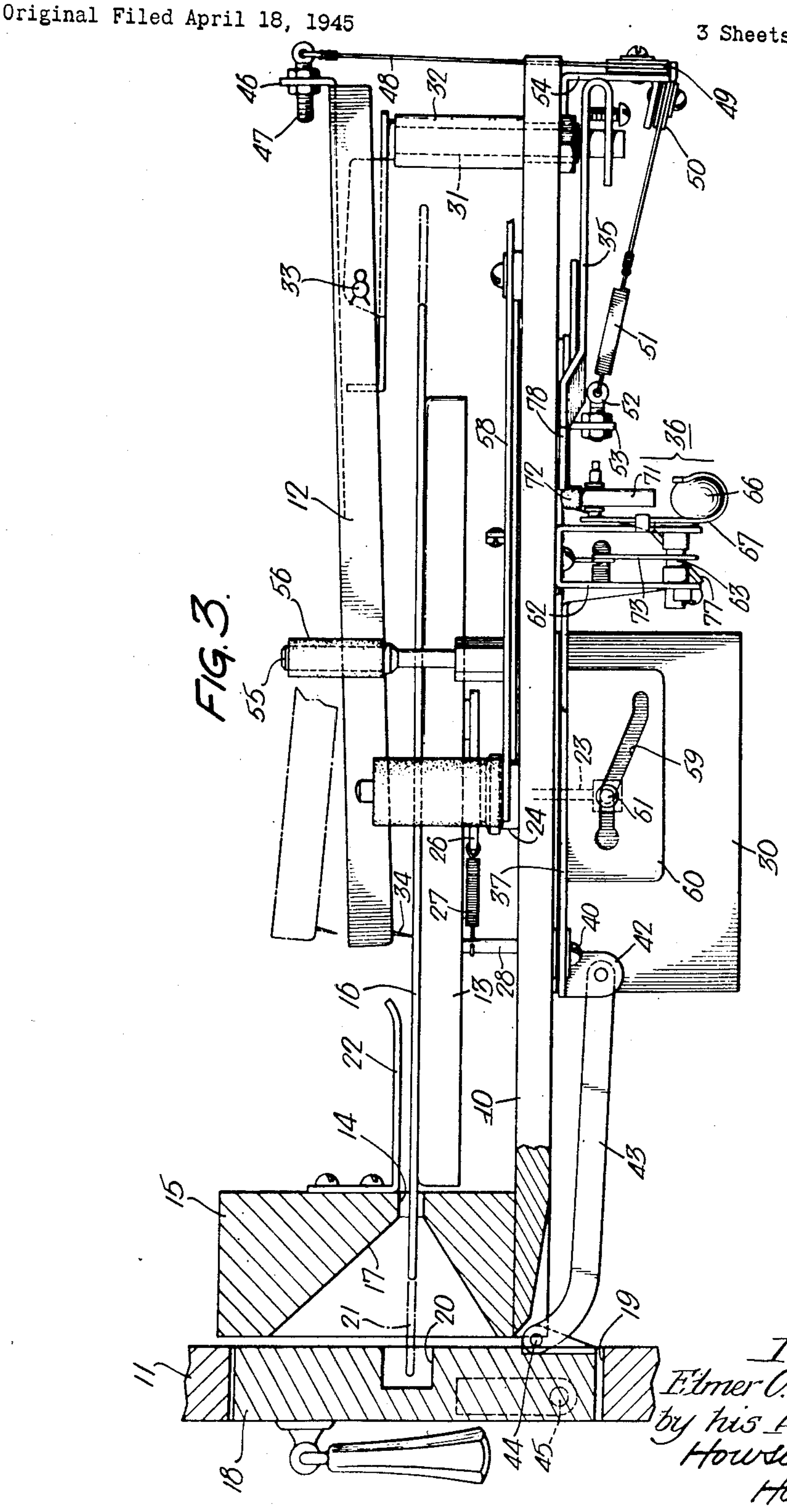
Fig. 3 shows the phonograph apparatus in side elevation with the door in closed position and with a record on the turntable.

Referring first to Figs. 1 to 3, the phonograph mechanism is supported by a horizontal shelf or panel 10 within a casing or housing whose front wall is shown at 11, complete illustration of the casing being unnecessary. The phonograph tone arm and turntable are shown at 12 and 13, respectively. The phonograph apparatus is inaccessible to the user during operation, and provision is made for the playing of successive records simply by inserting them into a restricted slot-like opening 14 adjacent the turntable 13. To this end, there is provided a front wall member 15 which forms a part of the casing structure and which has the record-insertion opening 14 therein. A record 16 is shown on the turntable, and it will be noted that the record protrudes from the opening 14 into a recess 17 provided in member 15. The purpose of this arrangement is to enable insertion and removal of the record, as will be obvious. Adjacent the recess 17, and hingedly mounted on the outer part of the cabinet, is a manually operable door 18 which occupies the door opening 19 when in closed position. When closed, the door conceals the record insertion opening 14, and when opened it affords access to the said opening.

As shown in Fig. 3, the turntable 13 is arranged in relation to the restricted opening 14 so that the upper surface of the turntable is slightly above the bottom surface of the opening. This permits the record 16 to rotate freely with the turntable. It will be noted also that the door 18 has a recess 20 to accommodate a larger sized record represented in dot-and-dash outline at 21. A guide member 22 is secured to the wall 15 and extends therefrom above the turntable as shown. This member may take the form of a strip or plate of metal or other material, and its purpose is to insure proper insertion of the record, as will be seen later. The record is centered on the turntable by means of a central pin or spindle 23 which is automatically retracted in response to opening movement of the door 18, as will be described further hereinafter. The turntable is supported by means of a bearing structure 24 carried by the supporting shelf or panel 10. The record-centering spindle 23 is slidably mounted within the said structure. The turntable is driven in conventional manner (see Fig. 1) by means of a driving friction wheel 25 which is mounted on a pivoted bracket 26 and is maintained in engagement with the turntable flange by a spring 27, one end of which is attached to the bracket 26 while the other end is secured to a stationary pin 28 on the supporting panel 10. The wheel 25 is driven by a smaller wheel or roller 29 which in turn is suitably driven by the driving motor unit 30.

The tone arm 12 is mounted at the upper end of a spindle 31 (see Fig. 3) which is rotatably supported by a hollow post 32 mounted on the supporting panel 10, so that the tone arm is adapted to move laterally or horizontally with respect to a record on the turntable. The tone arm is pivotally mounted on a horizontal pivot 33 so as to be vertically movable with respect to the record. At its free end the tone arm carries a suitable pick-up which may be of conventional form and which includes the usual needle or stylus 34. At the lower end of the tone-arm-carrying spindle 31, there is provided an extending arm 35, the purpose of which is to actuate the switch mechanism 36 at the end of the playing of a record so as to automatically stop the rotation of the turntable, as will be further described hereinafter.

The record-centering pin and the tone arm are both controlled by the movements of the door 18. To this end, there is provided at the under side of the supporting panel 10 a slide member 37 (see Fig. 2), which is slidably supported by the supporting panel. Member 37 has slots 38 and 39 therein, by means of which it is slidably supported for rectilinear movement forwardly and rearwardly. As shown in Fig. 1, the supporting arrangement for the slide member 37 may include a pair of suitable fastening elements, such as screws 40 and 41, which are carried by the supporting panel 10 and which extend through the slots 38 and 39 respectively. Thus it will be seen that the slide member 37 is supported for guided movement in the manner stated. At its forward end, the slide member 37 has a depending lug 42 to which one end of a connecting link 43 is pivotally connected. The other end of link 43 is pivotally connected to the door 18 at a point 44 (see Fig. 3) offset from the hinge or pivot 45 of the door. When the door is opened, the link 43 is pulled forwardly so as to move the slide member 37 forwardly, and when the door is closed, the said parts are moved in the reverse direction so that the slide member 37 moves rearwardly.

The tone arm 12 is actuated in response to movement of door 18 and slide member 37 by means of the mechanism now to be described. As clearly shown in Fig. 3 there is provided at the rear of the tone arm 12 an extending lug 46 carrying a screw 47 to which one end of a flexible cord 48 is attached. The cord passes around a pair of pulleys 49 and 50, and its other end is attached to one end of a helical spring 51 whose other end is secured to a screw 52 carried by a depending lug 53 on the slide member 37. The pulleys 49 and 50 are rotatably mounted on a bracket 54 secured to the under side of the supporting panel 10. The pulleys are so arranged that when a pull is exerted on the cord 48 by the forward movement of the slide member 37, the tone arm is subject to both vertical and horizontal force components which lift the tone arm off of the record and swing it laterally to a position in which it may be lowered onto the next record. Furthermore, the horizontal pivot 33 of the tone arm is so arranged in relation to the vertical pivotal support that the vertical force component is effective to lift the needle or stylus off the record before the tone arm is moved laterally, thus preventing scratching of the record. When the slide member 37 is in its rearward position, i. e. when the door 18 is closed, there is no tension on the spring 51 and the tone arm is in its operative position. When the slide member is in its forward position, i. e. when the door 18 is open, the spring 51 is placed under tension and the tone arm is raised. The tension of the spring urges the tone arm laterally against a stop post 55 having a cushion covering 56 thereon.

The post 55 is caused to limit the outward movement of the tone arm according to the size of an inserted record by virtue of the mounting of said post on one of a pair of feeler arms 57 and 58. As indicated by the solid and dot-and-dash representations in Fig. 1, the feeler arms assume different positions for different sized records, e. g. 10 inch and 12 inch records. Since the present invention is not concerned with the feeler arms and their further functions, further description thereof is unnecessary. For complete illustration and description of these elements and associated parts reference may be had to the aforementioned patent.

As previously indicated the record-centering pin 23 is controlled by the movement of the door 18. For the purposes of this specification, it suffices to note that vertical movement of the pin is effected by a cam slot 59 provided in a depending plate 60 formed integrally with the slide member 37. A transverse pin 61, connected to the pin 23, is disposed in slot 59 and acts as a cam follower. The slot 59 is so shaped that it lowers and raises the centering pin 23 in response to opening and closing movements of the door 18. Thus when the door is opened, the centering pin is retracted to permit removal of one record and insertion of another. When the door is closed, the centering pin is projected upwardly through the center hole of the inserted record.

Referring now to Figs. 4 to 8, there is shown in detail the switch mechanism 36 and its cooperation with certain of the parts hereinbefore described, the purpose being to automatically stop the turntable at the end of the playing of a record and to start the turntable in response to closing movement of the door 18.

Figure 4:
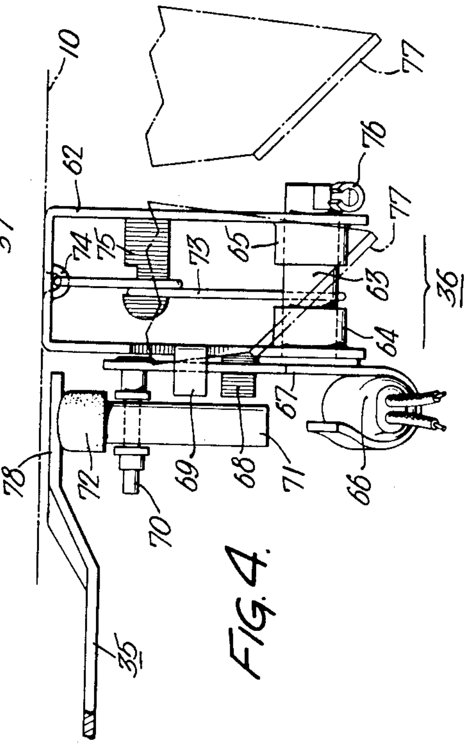
Fig. 4 is a detail view of the switch mechanism which controls the turntable operation, said view being taken along line 4—4 of Fig. 1.
Figure 5:
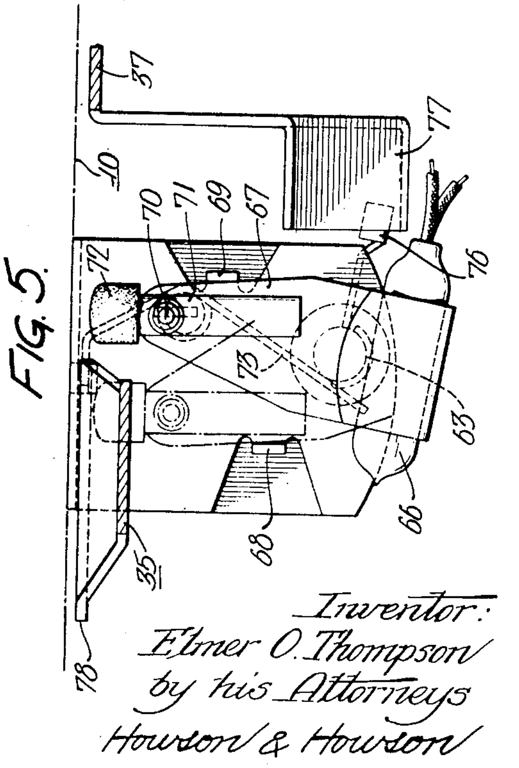
Fig. 5 is a view of the same mechanism taken from the left side of Fig. 4.

The switch mechanism comprises an inverted U-shaped supporting bracket 62 secured to the underside of the supporting panel 10, the under surface of which is represented by the dot-and-dash horizontal line in Figs. 4 and 5. The bracket 62 carries a rotatable shaft 63 which is suitably journaled for instance in bearings 64 and 65 which may form integral parts of the supporting bracket. A mercury switch 66 is carried by a supporting member 67 which is mounted on one end of the shaft 63 so as to be rotatable therewith. A pair of stops 68 and 69, formed integrally with the supporting bracket 62, serve to limit the movement of the switch-supporting member 67 as shown in Fig. 5. Member 67 extends upwardly from the axis of rotation and carries a pin 70 at its upper end, upon which an actuating element 71 is pivotally mounted. The upper end of element 71 is provided with a friction hood 72 preferably formed of rubber or like material. The element 71 functions cooperatively with the previously mentioned arm 35 to actuate the switch mechanism at the end of the playing of a record, as will be described presently.

A resilient member 73, which may take the form of a piece of spring wire or the like, is secured to the bracket 62 at 74 and is wound about a supporting projection or finger 75 on the bracket 62, and has its lower end portion in frictional engagement with the shaft 63 so as to impose a frictional drag on the shaft and thus tends to oppose rotation of the shaft. The purpose of this will appear presently. At the end of shaft 63 opposite the switch 66, there is provided a resilient finger 76 which is engageable by a cam member 77 (see Fig. 2) formed integrally with the slide member 37, the purpose of which will also appear presently.

Figures 7, 8:
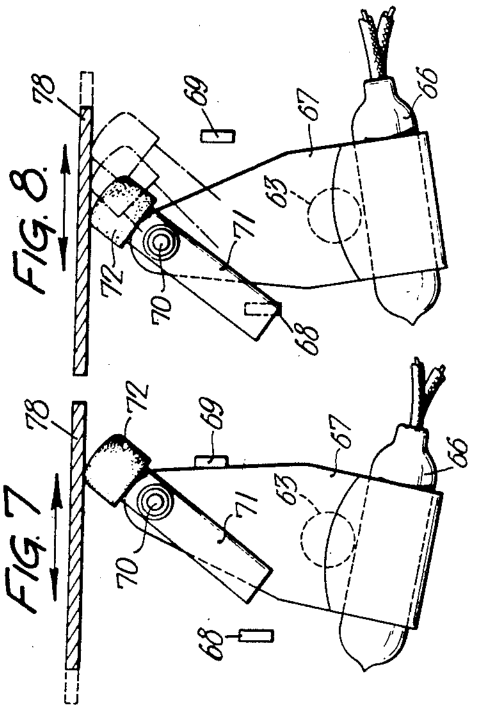
Figs. 7 and 8 are explanatory views showing how the switch is operated.

Referring again to Fig. 1, the arm 35, which extends from the lower end of the tone arm-supporting spindle 31, has an enlarging end forming a plate 78 which is adapted to engage the friction hood 72, as shown in Figs. 7 and 8. The arm 35 is so positioned in relation to the tone arm 12 that the plate 78 engages the friction hood 72 when the needle or stylus engages the eccentric groove at the end of a record, the said groove being shown in Fig. 1 at 79. The eccentricity of the groove 79 may vary from one record to another, and the switch mechanism is designed to insure operation of the switch regardless of such variation.

The operation of the switch mechanism may best be explained with specific reference to Figs. 5 to 8. The mercury switch 66 is connected in circuit with the turntable driving motor so as to control the operation thereof, and during playing of a record, the switch is in the position of Figs. 5 and 7 in which it is closed, so that the turntable driving motor is energized.

Prior to the engagement of plate 78 with the friction hood 72, the element 71 is vertically positioned, as shown in Fig. 5, due to the fact that its supporting pin 70 is above its center of mass. As the needle or stylus approaches the eccentric groove at the end of the record, the plate 78, moving from left to right, as viewed in Figs. 5, 7 and 8, engages the friction hood 72 and deflects the element 71 to a position such as shown in Fig. 7. When the stylus enters the eccentric groove at the end of the record, the plate 78 moves back and forth, as indicated by the double head arrow in Figs. 7 and 8. The range of this oscillatory motion of the plate 78 is indicated by the dotted line representation in Fig. 6 and the associated double head arrow. Movement of the plate 78 toward the left in Figs. 7 and 8 causes application of a force to the pin 70 through the upper portion of element 71, which force moves the switch support 67 counter-clockwise from the position of Fig. 7, as shown in Fig. 8. If the eccentricity of the record groove is relatively great, the first left-hand movement of plate 78 may move switch 66 sufficiently to open it. If the groove eccentricity is not so great, the element 71 is stepped progressively toward the left as shown in Fig. 8, thereby moving the switch progressively until it opens. Thus the switch is opened even though the eccentricity of the record groove may vary from one record to the next. The friction drag element 73 serves to maintain the switch in any position to which it is moved.

Figure 6:
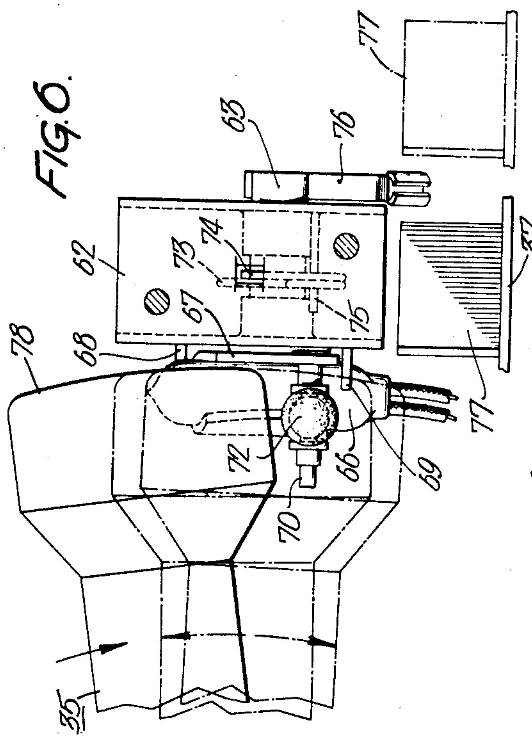
Fig. 6 is a plan view of the same mechanism.

During the playing of a record, the cam member 77 is in the left hand position shown in Figs. 4 and 6. When the door 18 is opened, after the playing of a record, the cam member 77 moves to the right hand position shown in dotted outline in Figs. 4 and 6, and during such movement the upper surface of the inclined cam member engages the end portion of resilient finger 76. This would effect actuation of the switch mechanism to open the switch 66 if the switch had not already been opened by the action of the plate 78, as above described. Consequently, resilient finger 76, being in a raised position, is engaged by the upper part of the cam member 77 and is deflected sufficiently to enable its end portion to ride over the upper part of the cam member as the latter moves to the right hand position shown.

When the door 18 is closed to initiate the playing of another record, the cam member 77 moves to the left hand position shown in Figs. 4 and 6. During this movement, the lower face of the inclined cam member engages the finger 76 and moves it downwardly, thus causing rotation of shaft 63 in a direction to close the switch 66 and thus energize the turntable driving motor. During this operation, the resilient finger 76 rides over the lower portion of the inclined cam member 77 to the position shown in Fig. 4.

Thus the cam member 77 functions, in response to movement of the door 18, to insure that the switch 66 is opened and to close the switch so as to start rotation of the turntable when the door is closed.

Considering the operation of the phonograph apparatus as a whole, let us assume that a record is being played, the door 18 being closed. At the end of the playing of the record, the switch mechanism 36 opens the switch 66 to stop the turntable in the manner just described. When the door 18 is opened to remove the record which has just been played and to insert a new record, the slide member 37 moves forwardly, and in doing so it performs several functions. It lifts the tone arm 12 off of the record and moves it to a starting position above the marginal portion of the record through the action of the cord and pulley arrangement, as hereinbefore described. It also lowers the record centering spindle 23 to its inoperative position. It also insures that the motor switch 66 is opened.

The user may now remove the record which has just been played and insert a new record. When the door 18 is closed, the rearward movement of slide member 37 raises the centering spindle 23, closes switch 66 to start rotation of the turntable, and lowers the tone arm to bring the stylus into engagement with the marginal portion of the record. The parts are so designed that these functions are performed in the order named. The operating cycle is now repeated.

While it has been assumed that the user desires to change records, as will usually be the case, in some instances the user may desire to repeat the playing of a record. In such case he simply opens the door 18 and then closes it without changing records. The opening and closing movements of the door effect automatic operation of the parts to repeat the playing of the record, as will be obvious from the foregoing description.

It should be noted also that the playing of a record may be interrupted at any time merely by opening the door 18, in which case the cam member 78 will open switch 66, as hereinbefore described.

While the control arrangement of the present invention has been illustrated and described with reference to a particular embodiment, the invention is not limited thereto but is capable of various modifications and other embodiments as will appear to those skilled in the art.

I claim:

1. In a phonograph having a motor driven turntable and an associated tone arm, a switch support pivoted for movement about a horizontal axis, a pair of stops for said support establishing two positions thereof, a motor-controlling mercury switch carried by said support so as to be closed when the support is in one of said positions and opened when the support is in the other of said positions, said support being in the switch-closed position during the playing of a record, an actuating element pivotally mounted on said support at a point spaced from said axis, said element being pivoted above its center of mass so as to be biased by gravity to a normal position, said element having a friction surface at one end, and a member connected to said tone arm and movable thereby in a path to deflect said element to an inclined position and to exert force thereon by engagement with said friction surface upon oscillatory movement of the tone arm at the end of the playing of a record, whereby to move said support to the switch-opened position.

2. Apparatus according to claim 1, wherein said actuating element is mounted on said switch support above the axis of movement of the latter, and the upper end of said element is provided with a friction surface.

3. In a phonograph having a motor-driven turntable and an associated tone arm, a switch support pivoted for movement about a horizontal axis, a pair of stops for said support establishing two positions thereof, a motor-controlling mercury switch carried by said support so as to be closed when the support is in one of said positions and opened when the support is in the other of said positions, said support being in the switch-closed position during the playing of a record, an actuating element pivotally mounted on said support at a point spaced from said axis, said element being pivoted above its center of mass so as to be biased by gravity to a normal position, said element having a friction surface at one end, a member connected to said tone arm and movable thereby in a path to deflect said element to an inclined position and to exert force thereon by engagement with said friction surface upon oscillatory movement of the tone arm at the end of the playing of a record, whereby to move said support to the switch-opened position, and manually-operable means for moving said support to the switch-closed position for commencement of the next record-playing operation.

4. In a phonograph having a motor-driven turntable and an associated tone arm, a switch support pivoted for movement about a horizontal axis, a pair of stops for said support establishing two positions thereof, a motor-controlling mercury switch carried by said support so as to be closed when the support is in one of said positions and opened when the support is in the other of said positions, said support being in the switch closed position during the playing of a record, an actuating element pivotally mounted on said support at a point spaced from said axis, said element being pivoted above its center of mass so as to be biased by gravity to a normal position, said element having a friction surface at one end, a member connected to said tone arm and movable thereby in a path to deflect said element to an inclined position and to exert force thereon by engagement with said friction surface upon oscillatory movement of the tone arm at the end of the playing of a record, whereby to move said support to the switch-opened position, a second actuating element connected to said support, and a manually-controllable slide member having means engageable with said second element to actuate said support to the switch-closed position for commencement of the next record-playing operation.

5. In a phonograph having a motor-driven turntable and an associated tone arm, a rotatable horizontal shaft, a switch support carried by said shaft, a pair of stops for said support establishing two positions thereof, frictional drag means engaging said shaft to restrain said support in either of said positions, a motor-controlling mercury switch carried by said support so as to be closed when the support is in one of said positions and opened when the support is in the other of said positions, said support being in the switch-closed position during the playing of a record, an actuating element pivotally mounted on said support at a point spaced from said shaft, said element being pivoted above its center of mass so as to be biased by gravity to a normal position, said element having a friction surface at one end, a member connected to said tone arm and movable thereby in a path to deflect said element to an inclined position and to exert force thereon by engagement with said friction surface upon oscillatory movement of the tone arm at the end of the playing of a record, whereby to move said support to the switch-opened position, an actuating finger connected to said shaft, and a manually-controllable slide member having means engageable with said finger to actuate said support to the switch-closed position for commencement of the next record-playing operation.

ELMER O. THOMPSON.

References Cited in the file of this patent

UNITED STATES PATENTS

| Number | Name | Date |
|---|---|---|
| 1,887,309 | Kincannon | Nov. 8 ,1932 |
| 1,919,378 | Pepin | July 25, 1933 |
| 1,981,175 | Horn | Nov. 20, 1934 |
| 2,022,293 | Mallina | Nov. 26, 1935 |
| 2,042,915 | Twist | June 2, 1936 |
| 2,100,686 | Collaro et al. | Nov. 30, 1937 |
| 2,295,460 | Farrow | Sept. 8, 1942 |
| 2,396,094 | Gay | Mar. 5, 1946 |
| 2,527,646 | Mullaney | Oct. 31, 1950 |
| 2,548,372 | Hopffgarten | Apr. 10, 1951 |
| 2,596,016 | Falk | May 6, 1952 |

FOREIGN PATENTS

| Number | Country | Date |
|---|---|---|
| 114,471 | Australia | Jan. 15, 1942 |